G. A. HARVEY.
Corn Harvester.

No. 235,869. Patented Dec. 28, 1880.

Witnesses.

INVENTOR
George A. Harvey.
By Attorneys

G. A. HARVEY.
Corn Harvester.

No. 235,869.　　　　Patented Dec. 28, 1880.

Witnesses　　　　　　　　INVENTOR
　　　　　　　　　　　　George A Harvey
　　　　　　　　　　　By
　　　　　　　　　　　　Attorneys

UNITED STATES PATENT OFFICE.

GEORGE A. HARVEY, OF CHICAGO, ILLINOIS.

CORN-HARVESTER.

SPECIFICATION forming part of Letters Patent No. 235,869, dated December 28, 1880.

Application filed June 6, 1878.

*To all whom it may concern:*

Be it known that I, GEORGE A. HARVEY, of Chicago, in the county of Cook and State of Illinois, have invented a new and useful Improvement in Corn-Harvesters, which is fully described in the following specification, reference being had to the accompanying drawings, in which—

Figure 1:
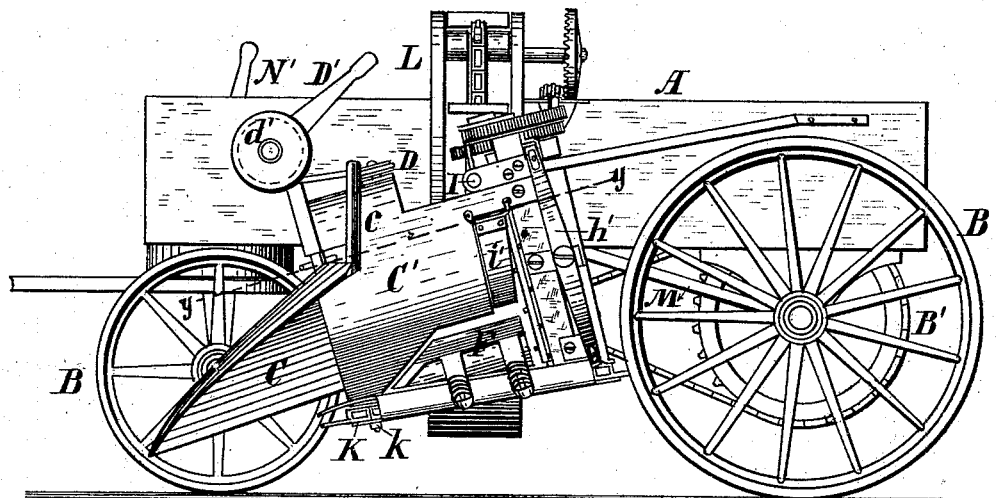
Figure 2:
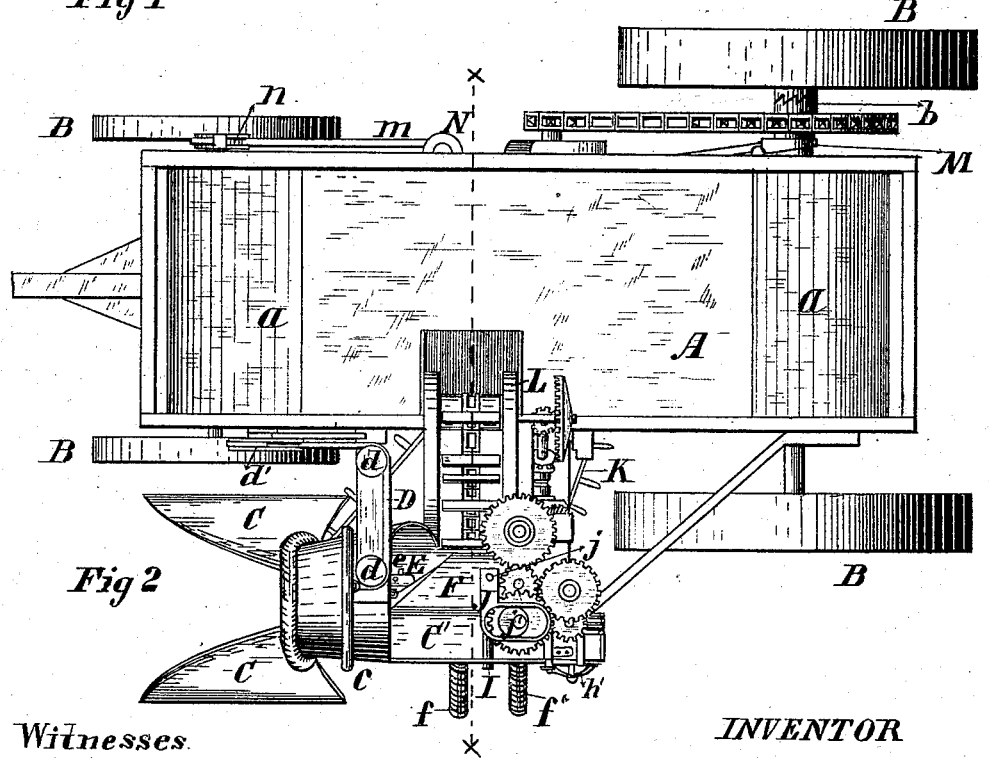
Figure 3:
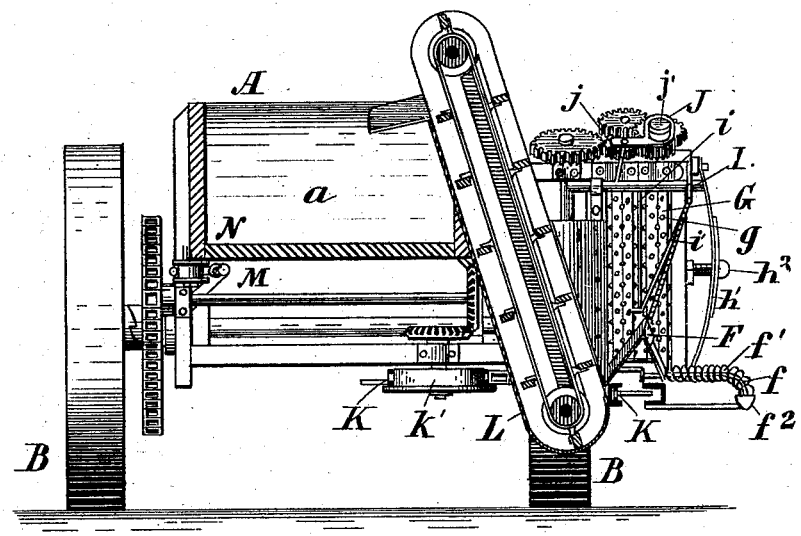

Figure 1 represents a side elevation of a machine embodying my improvements; Fig. 2, a plan view of the same; Fig. 3, a transverse section taken on the line $xx$, Fig. 2; and Fig. 4, a detail plan section taken on the line $yy$, Fig. 1.

My invention relates to that class of corn-harvesters in which the ears are picked from the stalks while the latter are left standing in the field.

The invention consists in various devices and combinations of devices intended to insure the perfect delivery of the corn to the picking-rollers and the breaking of the ears from the stalks without crushing the ears, all of which will be hereinafter fully set forth.

In the drawings, A represents the carriage or wagon body, which is mounted on wheels B, the rear wheels being drivers by means of a sprocket-wheel, B', mounted loosely on the rear axle, and connecting with one of the drive-wheels by a clutch, $b$. At one side of the wagon a gatherer, C, is arranged, of hood form, similar to that described in my prior application; but, instead of hinging the hood at its rear end, so as to make the whole movable, in the present instance I make the rear or hood portion, C', stationary, and hinge the gatherer C to it at the front lower corners and provide a bent rod, $c$, extending up loosely over the top of the hood and joining the two parts of the gatherer, as shown in Figs. 1 and 2 of the drawings. A chain, D, is attached to the upper part of the curved rod, which is passed around pulleys $d\ d$ to a wheel, $d'$, on the side of the wagon, provided with a lever, D', by means of which the gatherer may be raised and lowered to pick up the corn.

Figure 4:
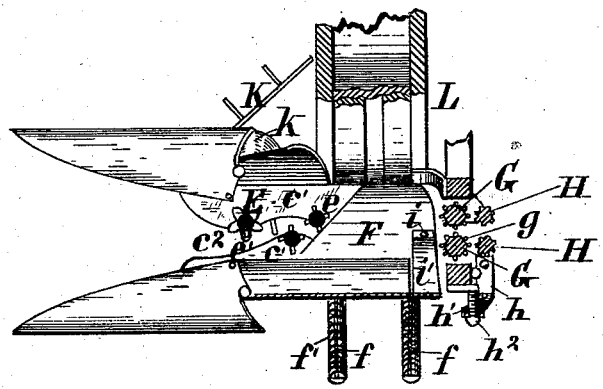

The plates $c'$ at the bottom of the hood, between which the corn passes on its way back to the picking-rollers, are constructed so as to provide an irregular or zigzag path, $c^2$, between them, as shown in Fig. 4 of the drawings.

At the mouth of the hood are arranged three or more upright shafts, E, provided with pins or teeth $e$, and standing one back of the other, but on opposite sides of the zigzag pathway, as shown in Fig. 4 of the drawings, alternating first on one side and then on the other. The front shaft, E, is also provided at its lower end with a star-wheel, $e'$, the arms of which project over the opening for the stalks. In rear of these three shafts is an elastic shield or protector, F, similar to that heretofore employed by me, but supported differently. Instead of joining the shield to the hood, I mount it upon rods $f$, which extend outward horizontally at the side of the machine, and are then bent under and fastened to the side supports below the hood, as shown in Fig. 3 of the drawings. The shield is free to slide on these rods, and outside of it are spiral springs $f'$, coiled around the rods and held in position by stops $f^2$ thereon, whereby the shield is held in over the opening, but will yield outward to the pressure of the ingoing stalks, the side of the hood being cut away to accommodate its outward sliding motion.

In rear of the hood and elastic shield is a pair of polygonal rollers, G, provided with teeth $g$, arranged along their angular edges. These rollers are mounted in a suitable supporting-frame, in a position slightly inclined forward, as shown in Fig. 1 of the drawings, and immediately in rear of them is arranged another pair of fluted rollers, H, supported in a similar position. The outward roller of this rear pair is mounted in bearings $h$, which have a slight adjustment and are held in position by a spring, $h'$, so that this roller may yield outward somewhat to accommodate the stalks passing through between them.

The pressure of the spring upon the bearings may be regulated by a set-screw, $h^2$, and the movement permitted should not be sufficient to disengage the gear-wheels at the upper ends of the rollers, so as to stop their motion.

Just in front of the upper end of the rollers G is a short horizontal shaft, I, mounted in suitable bearings, in which it is free to slide back and forth. A rod, $i$, depends from this shaft in front of the opening between the rollers, and is attached at its lower end to an inclined support or brace, $i'$, hinged at its upper end to the outside of the hood.

A cam-yoke, J, is connected by a rod, $j$, to the shaft I, and is fitted about a cam, $j'$, on a driving-gear attached to one of the rollers G, so that the revolution of the latter communicates a reciprocating motion to the shaft and rod in front of the rollers G.

A toothed chain, K, is arranged around suitable pulleys $k$, in position to carry the corn in through the opening below the hood, as in my prior invention; but I arrange the inner driving-wheel, $k'$, of this chain so that the latter will be carried in the rear and in front of the elevator, and therefore will not interfere with the delivery of the ears of corn.

The elevator L is arranged at one side of the wagon, just in front and inside of the picking-rollers, and delivers immediately into the wagon-body. At the end of the wagon-body are placed inclines $a$, covering the angular corners. They may be single boards or solid pieces fitting the corners, and are for the purpose of facilitating the unloading of the wagon, as it is evident that with these inclines shovels may be readily inserted at either end of the board.

It will be understood, of course, that the moving parts of the machine are driven by gearing suitably arranged for this purpose, but which need not be particularly described here, as the arrangement will be readily understood by persons familiar with this class of machines.

The sprocket-wheel B' is held up to engagement with the drive-wheel by means of a spring, and the clutch is disengaged by means of a forked lever, M, pivoted to the wagon and connected at its forward end to a chain, $m$, extending outward around a pulley, N, and thence forward to a wheel, $n$, provided with a lever, N'.

It is evident that the forward pull on the chain produced by vibrating the lever will operate the forked lever, so as to slide the wheel B' on the axle.

The zigzag path for the stalks inside of the hood, in connection with the toothed rollers arranged alternately on opposite sides thereof, effectually straightens up the stalks and lopped ears, bringing them into proper position for presentation to the picking-rollers. The lopping ears have heretofore been found to be one of the most serious obstacles to the working of the machine, as they approach the picking-rollers in almost every position, and very frequently with the point first. If by any possibility one of the lopping branches should pass the straightening-rollers with the ear-point first, the vibrating guard composed of the shaft I and depending rod $i$ will strike the ear to one side and prevent it from entering point first, so as to be crushed; but at the same time this guard does not interfere with the feed of the stalks through the picking-rollers in the proper position. The ears are broken off by the first hexagonal rollers, and in most instances the break will be made between two angular projections close to the butt of the ear, and the husks will be caught by the teeth on these rollers and stripped from the ear. The fluted rollers behind the pickers seize the stalks usually before the ears reach the pickers, so that the stalks are held by the second set of rollers, and the picking is done much more certainly and efficiently. The ears of corn fall to the elevator, by which they are taken, carried up, and delivered into the wagon.

Having thus described my invention, what I claim as new, and desire to secure by Letters Patent, is—

1. The stationary hood C', projecting in front of the pickers, in combination with the gatherer C, hinged thereto, substantially as described.

2. The stationary hood, in combination with the hinged gatherer C, provided with the bail or bent rod $c$, chain D, and lever D', substantially as described.

3. The plates $c'$ at the bottom of the hood, constructed and arranged to form a zigzag path, $c^2$, for the entering stalks, substantially as described.

4. The plates $c'$, arranged to form a zigzag path for the stalks, in combination with the upright toothed shafts E, arranged alternately on opposite sides of the path, substantially as described.

5. The shield F, in combination with the supporting-rods $f$ and spiral springs $f'$, substantially as described.

6. A vibrating guard arranged to reciprocate in front of the picking-rollers, substantially as and for the purpose set forth.

7. The sliding shaft I, provided with a pendent rod, $i$, cam-yoke J, and cam $j'$, substantially as described.

8. The picking-rollers G, polygonal in cross-section, and provided with teeth $g$, arranged along their angular edges, substantially as described.

9. The toothed picking-rollers G, in combination with the fluted rollers H, arranged in rear thereof, substantially as and for the purpose set forth.

10. The supplemental rollers H, one of which is mounted in elastic yielding bearings, substantially as described.

11. The elevator L, in combination with the toothed chain K, arranged to run entirely around the elevator, substantially as described.

12. The picking-rollers G, slightly inclined from a perpendicular, regularly polygonal in cross-section, having teeth on their angular edges, and arranged to bite off the ears between those edges and strip off the husks by means of those teeth, substantially as described.

GEORGE A. HARVEY.

Witnesses:
JNO. C. MACGREGOR,
W. C. CORLIES.